UNITED STATES PATENT OFFICE 2,483,213

ALPHA NAPHTHALENE SULFONIC ANHYDRIDE

Hans Z. Lecher, Plainfield, and Frederic Henry Adams, Bound Brook, N. J., assignors to American Cyanamid Company, New York, N. Y., a corporation of Maine No Drawing. Application June 14, 1947, Serial No. 754,768

7 Claims. (Cl. 260—545)

This invention relates to alpha naphthalene sulfonic anhydride and to methods of making it.

In the past alpha naphthalene sulfonic acid has been an important raw material or intermediate for the production of dyestuffs. It has, however, been difficult to prepare in pure form because ordinary sulphonation procedures result in a mixture of the alpha and beta isomers and therefore involve a serious separation problem. As a result, alpha naphthol is usually produced from alpha naphthylamine in spite of the higher cost of this process.

The present invention produces a new compound, alpha naphthalene sulfonic anhydride, having the following formula:

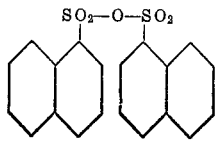

This compound can be transformed into naphthalene alpha sulfonic acid or its salts or into esters or amides or other compounds desired. The process of preparing the anhydride is cheap and involves a direct sulfonation of naphthalene. The product is obtained without contamination with beta isomers.

Essentially the process consists in reacting naphthalene with sulfur trioxide in one of the following solvents: dimethyl sulfate, diethyl sulfate, phosphorus oxychloride. These compounds possess adequate solvent power for naphthalene and are extremely good solvents for sulfur trioxide. It is also desirable that the solvent used be relatively inert against sulfur trioxide.

In general, the process of the present invention proceeds by dissolving the naphthalene in the solvent being used and then treating with sulfur trioxide. The amount of solvent is not at all critical because it is not necessary that the naphthalene be in complete solution. If it is partially dissolved, the reaction proceeds rapidly and therefore excessive amounts of the solvent are unnecessary. From the theoretical equation

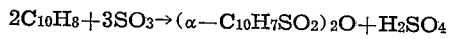

it will be noted that 1½ mols of sulfur trioxide are required for every mol of naphthalene. The reaction proceeds satisfactorily with the minimum amount of sulfur trioxide, but small excesses, for example up to two mols, do no harm and in fact are somewhat preferable.

The method of introduction of the sulfur trioxide into the reaction mixture may be varied. For example, the sulfur trioxide may be distilled directly from a reservoir or generator. It may be used in the form of converter gas from a contact sulfuric acid converter or it may be first dissolved in the solvent and introduced in solution form. This latter procedure should not be used with diethyl sulfate which is not inert to sulfur trioxide; to keep losses down, the time of contact of the sulfur trioxide with the diethyl sulfate should be reduced to a minimum.

Control of the reaction temperature is not critical, but cooling is desirable as the reaction is exothermic. The reaction proceeds smoothly and a readily filterable product is obtained. The solvent may be recovered after filtration without excessive loss.

For many purposes, it is not necessary that the naphthalene alpha sulfonic anhydride be obtained in pure form because often it is desired to transform it into other compounds. For example, if naphthalene alpha sulfonic acid is desired, the anhydride may readily be hydrolyzed with hot water and the sulfonic acid is obtained uncontaminated with salts. It is also possible to use the crude anhydride directly in preparing esters with alcohols or phenols or sulfonamides by treatment with amines. In such cases the reaction should be maintained anhydrous in order to prevent hydrolysis of the anhydride. For some purposes, it is desirable to obtain pure naphthalene sulfonic anhydride and in such cases the product may be purified by crystallization from an inert solvent such as toluene or by dissolving in acetone and precipitating with cold water.

Example 1

Twenty-five parts of naphthalene are dissolved in 150 parts of diethyl sulfate. The solution is cooled externally and into it is distilled 32 parts of sulfur trioxide. During this operation the temperature of the reaction mixture is not allowed to exceed 25° C. The thick slurry of crystals is then stirred well and filtered. The product can be purified by crystallization from toluene or by dissolving in acetone and precipitating with water. Pure alpha-naphthalenesulfonic anhydride melts at 185–186° C. It may be hydrolyzed to the acid by refluxing in water or dilute alkali. On refluxing with methanol it gives methyl alpha-naphthalenesulfonate, M. P. 77° C. It reacts with aqueous ammonia to give alpha-naphthalenesulfonamide.

Example 2

A solution of 21 parts of naphthalene in 142 parts of dimethyl sulfate is cooled to 23° C., some of the naphthalene separating from solution. Into the resulting mixture there is distilled 21 parts of sulfur trioxide, the temperature being maintained not above 30° C. The reaction mixture is then stirred and filtered. The product is slurried in water and filtered. It may be purified as described in Example 1.

*Example 3*

A solution of 55 parts of naphthalene in 235 parts of phosphorus oxychloride is cooled to 2° C. and treated with 60 parts of sulfur trioxide, the temperature never exceeding 25° C. The product is filtered, washed with carbon tetrachloride, and dried.

We claim:

1. Alpha-naphthalene sulfonic anhydride of the formula

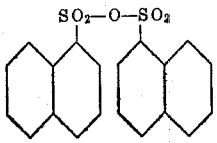

2. A method of preparing alpha-naphthalene sulfonic anhydride which comprises reacting sulfur trioxide with naphthalene in a solvent selected from the group consisting of dimethyl sulfate, diethyl sulfate, phosphorus oxychloride and mixtures thereof.

3. A method according to claim 2 in which the amount of sulfur trioxide is from 1½ to 2 mols per mol of naphthalene.

4. A method according to claim 2 in which the solvent is dimethyl sulfate.

5. A method according to claim 2 in which the solvent is dimethyl sulfate, the reaction is effected substantially at room temperature and alpha naphthalene sulfonic anhydride is recovered by filtration.

6. A method according to claim 2 in which the solvent is phosphorus oxychloride.

7. A method according to claim 2 in which the solvent is phosphorus oxychloride, the reaction is carried out substantially at room temperature and the alpha naphthalene sulfonic anhydride is recovered by filtration.

HANS Z. LECHER.
FREDERIC HENRY ADAMS.

REFERENCES CITED

The following references are of record in the file of this patent:

UNITED STATES PATENTS

| Number | Name | Date |
|--------|------|------|
| 1,503,937 | Canon | Aug. 5, 1924 |
| 1,999,955 | Carr et al. | Apr. 30, 1935 |
| 2,203,441 | Oliver | June 4, 1940 |
| 2,335,193 | Nawiaski et al. | Nov. 23, 1943 |
| 2,383,752 | Sveda | Aug. 28, 1945 |

OTHER REFERENCES

Comptes Rendus, French Academy of Sciences, 182; 855, 856, 857 (1926).

Karrer: "Organic Chemistry," Nordemann Publishing Co., New York, N. Y., 1938, p. 386.

Beilstein, vol. XI, p. 39, 1st sup.